United States Patent
Kresse, III

(10) Patent No.: US 12,263,737 B2
(45) Date of Patent: Apr. 1, 2025

(54) END OF BATTERY STATE OF CHARGE (SOC) VEHICLE SYSTEM OPERATION

(71) Applicant: Cummins Inc., Columbus, IN (US)

(72) Inventor: John P. Kresse, III, Martinsville, IN (US)

(73) Assignee: Cummins Inc., Columbus, IN (US)

( * ) Notice: Subject to any disclaimer, the term of this patent is extended or adjusted under 35 U.S.C. 154(b) by 735 days.

(21) Appl. No.: 17/276,701

(22) PCT Filed: Dec. 13, 2019

(86) PCT No.: PCT/US2019/066195
§ 371 (c)(1),
(2) Date: Mar. 16, 2021

(87) PCT Pub. No.: WO2020/123921
PCT Pub. Date: Jun. 18, 2020

(65) Prior Publication Data
US 2022/0024323 A1 Jan. 27, 2022

Related U.S. Application Data

(60) Provisional application No. 62/779,893, filed on Dec. 14, 2018.

(51) Int. Cl.
*B60L 15/20* (2006.01)
*B60K 6/28* (2007.10)
(Continued)

(52) U.S. Cl.
CPC ............ *B60L 15/2045* (2013.01); *B60K 6/28* (2013.01); *B60L 58/13* (2019.02);
(Continued)

(58) Field of Classification Search
CPC ...... B60L 15/2045; B60L 58/13; B60L 58/14; B60L 2210/10; B60L 2240/12;
(Continued)

(56) References Cited

U.S. PATENT DOCUMENTS 8,188,704 B2   5/2012   Reese et al.
8,450,974 B2   5/2013   Stewart et al.
(Continued)

FOREIGN PATENT DOCUMENTS

CN   103052527 A   4/2013
CN   103313894 A   9/2013
(Continued)

OTHER PUBLICATIONS

International Search Report and Written Opinion issued by the ISA/US, Commissioner for Patents, dated Apr. 8, 2020, for International Application No. PCT/US2019/066195; 10 pages.
(Continued)

*Primary Examiner* — Anshul Sood
(74) *Attorney, Agent, or Firm* — Faegre Drinker Biddle & Reath LLP

(57) ABSTRACT

The present disclosure provides a multi-stage method to extend the range of a vehicle. The method includes taking progressive actions on a vehicle as the state of charge (SOC) drops below defined levels. The method may include monitoring the SOC of the vehicle in relation to a SOC threshold or monitoring the SOC of the vehicle in relation to the distance remaining to a predetermined destination.

21 Claims, 4 Drawing Sheets

(51) Int. Cl.
*B60L 58/13* (2019.01)
*B60H 1/00* (2006.01)
*G07C 5/08* (2006.01)

(52) U.S. Cl.
CPC ...... *B60H 1/00735* (2013.01); *B60H 1/00878* (2013.01); *B60L 2210/10* (2013.01); *B60L 2240/12* (2013.01); *B60L 2240/14* (2013.01); *B60L 2240/486* (2013.01); *B60L 2240/54* (2013.01); *B60L 2240/60* (2013.01); *B60L 2250/10* (2013.01); *B60L 2250/16* (2013.01); *B60L 2260/54* (2013.01); *B60Y 2200/91* (2013.01); *B60Y 2200/92* (2013.01); *G07C 5/0825* (2013.01); *G07C 5/0833* (2013.01)

(58) Field of Classification Search
CPC ............ B60L 2240/14; B60L 2240/54; B60L 2240/60; B60L 2240/486; B60L 2250/10; B60L 2250/16; B60L 2260/54
See application file for complete search history.

(56) References Cited

U.S. PATENT DOCUMENTS

| | | | |
|---|---|---|---|
| 9,037,325 | B2 | 5/2015 | Lu |
| 9,579,981 | B2 | 2/2017 | Kesch |
| 9,751,423 | B2 | 9/2017 | Niioka et al. |
| 2011/0153141 | A1 | 6/2011 | Beechie et al. |
| 2011/0208378 | A1 | 8/2011 | Krueger et al. |
| 2013/0173101 | A1 | 7/2013 | Gilman et al. |
| 2013/0221741 | A1 | 8/2013 | Stanek et al. |
| 2013/0333353 | A1* | 12/2013 | Sujan .................... B60W 10/06 60/274 |
| 2014/0229043 | A1 | 8/2014 | Frank et al. |
| 2014/0278019 | A1* | 9/2014 | Be ........................ F02N 11/0818 701/112 |
| 2015/0005996 | A1 | 1/2015 | Bergkoetter et al. |
| 2015/0291145 | A1 | 10/2015 | Yu |
| 2016/0368483 | A1 | 12/2016 | Nawata et al. |
| 2017/0368913 | A1 | 12/2017 | Kumar et al. |
| 2017/0369010 | A1 | 12/2017 | Tarte |
| 2018/0056973 | A1 | 3/2018 | Belt et al. |
| 2018/0095141 | A1 | 4/2018 | Wild et al. |
| 2018/0102702 | A1 | 4/2018 | Ahn et al. |
| 2019/0375298 | A1* | 12/2019 | Symanow ............... B60L 50/61 |
| 2020/0180599 | A1 | 6/2020 | Kang et al. |
| 2020/0189557 | A1 | 6/2020 | Sakamoto et al. |
| 2020/0377076 | A1 | 12/2020 | Hussein et al. |

FOREIGN PATENT DOCUMENTS

| | | |
|---|---|---|
| CN | 103978974 A | 8/2014 |
| CN | 104393355 A | 3/2015 |
| CN | 105082937 A | 11/2015 |
| JP | 2005045883 A | 2/2005 |
| JP | 2012171520 A | 9/2012 |

OTHER PUBLICATIONS

International Preliminary Report on Patentability issued by the IPEA/US, Commissioner for Patents, dated Feb. 2, 2021, for International Application No. PCT/US2019/066195; 27 pages.

* cited by examiner

END OF BATTERY STATE OF CHARGE (SOC) VEHICLE SYSTEM OPERATION

CROSS-REFERENCE TO RELATED PATENT APPLICATIONS

The present application is a national stage filing of International Application No. PCT/US2019/066195, filed Dec. 13, 2019, which claims priority of U.S. Provisional Application No. 62/779,893, filed Dec. 14, 2018, the disclosures of which being expressly incorporated herein by reference.

TECHNICAL FIELD OF THE PRESENT DISCLOSURE

The present invention generally relates to a method for extending the range of a vehicle, and more particularly, to a method for extending the range of a vehicle as the state-of-charge ("SOC") of the vehicle drops below pre-defined levels.

BACKGROUND OF THE PRESENT DISCLOSURE

Batteries of electric vehicles may be prematurely aged or damaged if the vehicle is operated when the SOC is below a certain threshold. Typically, a vehicle operator uses SOC information similarly to how an operator uses fuel information provided by a fuel gauge on a conventional vehicle. As the SOC decreases, the operator judges (often based on prior experience) whether the vehicle can achieve its mission, and at some point, the operator ends the mission and charges the vehicle.

SUMMARY OF THE PRESENT DISCLOSURE

The present disclosure provides a multi-stage method to extend the range of a vehicle. The method includes taking progressive actions on a vehicle as the state of charge (SOC) drops below defined levels. The method may include monitoring the SOC of the vehicle in relation to a SOC threshold or monitoring the SOC of the vehicle in relation to the distance remaining to a predetermined destination.

According to an embodiment of the present disclosure, a method for notifying a driver of a state of charge ("SOC") of an electrical energy storage device of a vehicle is disclosed. The method comprises: monitoring the SOC; determining whether the SOC is less than a first SOC threshold; determining whether the SOC is less than a second SOC threshold, the first SOC threshold being greater than the second SOC threshold; and responding to the SOC being less than the first SOC threshold and greater than the second SOC threshold by activating a SOC conservation system, the SOC conservation system activating a first set of SOC conservation steps including at least one of: flashing an indicator light at a first rate, limiting a speed of vehicle to a first vehicle speed reducing a SOC power limit, managing vehicle acceleration, disabling an air conditioning compressor, decreasing a cooling rate, modifying a shift schedule, and reducing a rate of maximum allowable DC-DC converter power; and responding to the SOC being less than the first SOC threshold and the second SOC threshold, by causing the SOC conservation system to activate a second set of SOC conservation steps including at least one of: flashing an indicator light at a second rate that is greater than the first rate; limiting the speed of vehicle speed to a second speed that is less than the first speed, reducing an SOC power limit, disabling cooling loops thereby deactivating cooling, and activating vehicle warning flashers.

The method may further comprise determining whether the SOC is less than a third SOC threshold, the second SOC threshold being greater than the third SOC threshold; responding to the SOC being less than the first SOC threshold and the second SOC threshold and greater than the third SOC threshold by causing the SOC conservation system to activate a second set of SOC conservation steps including at least one of: flashing an indicator light at a second rate that is greater than the first rate; limiting the speed of vehicle speed to a second speed that is less than the first speed, reducing an SOC power limit, disabling cooling loops thereby deactivating cooling, and activating vehicle warning flashers; and responding to the SOC being less than the first SOC threshold, the second SOC threshold, and the third SOC threshold by causing the SOC conservation system to activate a third set of SOC conservation steps.

The thirds set of SOC conservation steps may further include activating an internal combustion engine. The vehicle may be a hybrid electric vehicle, wherein the third set of SOC conservation steps further includes activating an internal combustion engine of the vehicle. When the SOC is greater than the first SOC threshold, the SOC conservation system may be deactivated. The vehicle may be a battery electric vehicle. The vehicle may be a range extended electric vehicle.

According to another embodiment of the present disclosure, a method of notifying a driver of a vehicle of a state of charge ("SOC") of an electrical energy storage device of the vehicle in relation to a destination is disclosed. The method comprises: receiving destination information; calculating a route and a distance in response to receiving the destination information; determining whether a current SOC of the electrical energy storage device is sufficient to reach the destination; responding to the current SOC being insufficient to reach the destination by activating a set of SOC conservation steps; and monitoring the SOC of the electrical energy storage device until the vehicle reaches the destination.

The set of SOC conservation steps may include at least one of: flashing an indicator light, limiting speed of vehicle, reducing an SOC power limit, limiting vehicle acceleration, disabling an air conditioning compressor, decreasing cooling rate, modifying shift schedule, reducing a rate of maximum allowable DC-DC converter power, deactivating cooling, activate vehicle warning flashers, activating the indicator light, providing a verbal indication to the driver of the vehicle, and shutting down a high voltage system of the vehicle. The set of SOC conservation steps may include activating an internal combustion engine of the vehicle. The vehicle may be a battery electric vehicle. The vehicle may be a range extended electric vehicle. The vehicle may be a hybrid electric vehicle, wherein the set of SOC conservation steps further includes activating an internal combustion engine of the vehicle. The method may further comprise responding to the current SOC being sufficient to reach the destination by monitoring the SOC of the electrical storage device until the vehicle reaches the destination.

According to yet another embodiment of the present disclosure, a method for notifying a driver of a state of charge ("SOC") of an electrical energy storage device of a vehicle is disclosed. The method comprising: monitoring the SOC; determining whether the SOC is less than a first SOC threshold; determining whether the SOC is less than a second SOC threshold, the first SOC threshold being greater than the second SOC threshold and the third SOC threshold; and responding to the SOC being is less than the first SOC threshold and greater than the second SOC threshold by activating a SOC conservation system, the SOC conservation system activating a first set of SOC conservation steps that conserve a first amount of energy; and responding to the SOC being less than the first SOC threshold and the second SOC threshold by causing the SOC conservation system to activate a second set of SOC conservation steps that conserve a second amount of energy that is greater than the first amount of energy.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

Figure 1:
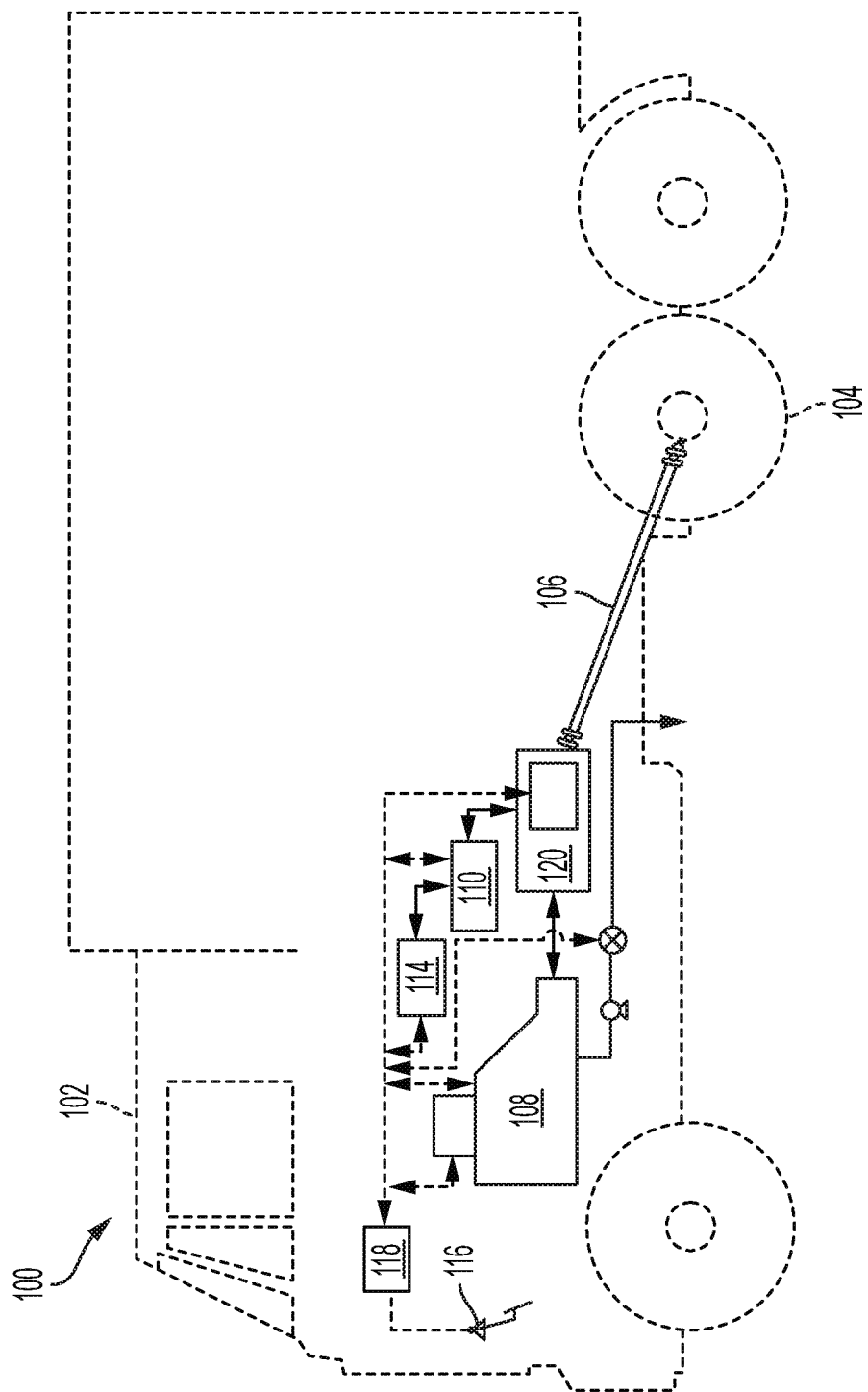
FIG. 1 is a schematic block diagram of a hybrid vehicle system.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

The present disclosure provides a multi-stage method to extend the range of a vehicle. The method includes taking progressive actions on a vehicle as the state of charge (SOC) drops below defined levels. The method may include monitoring the SOC of the vehicle in relation to a SOC threshold or monitoring the SOC of the vehicle in relation to the distance remaining to a predetermined destination.

As discussed further herein, the present disclosure provides a method for extending the range of a vehicle by monitoring a vehicle battery's SOC. The present disclosure discusses embodiments for a battery electric vehicle (BEV) and a range extended electric vehicle (REEV), also known as a series hybrid. However, it is within the scope of the present disclosure that the method described herein can be applied to other types of all electric and/or hybrid electric vehicles.

Referring first to FIG. 1, an exemplary system 100 includes a vehicle 102 that includes cargo carrying capability, although system 100 is not limited to cargo carrying vehicles. For example system 100 may also be used in transit vehicles, passenger vehicles, and other vehicles. System 100 further includes a hybrid power train having an internal combustion engine 108 and an electric device 110 selectively coupled to a drive shaft 106. The engine 108 may be any type of internal combustion engine known in the art. In some applications, the internal combustion engine 108 may be a diesel engine. In the example of FIG. 1, the engine 108 and the electric device 110 are coupled to the driveshaft 106 through a transmission 120 having a power splitter (not shown). However, any hybrid configuration known in the art, including at least series, parallel, and series-parallel, is contemplated herein.

The system 100 further includes an electric generator that is selectively coupled to the drive shaft 106 and further coupled to an electrical energy storage device 114. The electric generator in FIG. 1 is included with the electric device 110 as an electric motor/generator. However, the electric generator may be a separate device. The electrical energy storage device 114 is electrically connected to the generator 110 to store electricity generated by the generator 110. The electrical energy storage device 114 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 114 is contemplated herein, including a hyper-capacitor and/or an ultra-capacitor.

In certain embodiments, the system 100 includes the drive shaft 106 mechanically coupling the hybrid power train to a vehicle drive wheel 104. The system 100 may include any type of load other than or in addition to the drive wheel 104, for example any load that includes stored kinetic energy that may intermittently be slowed by any braking device included in the hybrid power train.

The system 100 further includes a deceleration request device 116 that provides a deceleration request value. An exemplary deceleration request device comprises a throttle pedal position sensor. However, any device understood in the art to provide a deceleration request value, or a value that can be correlated to a present negative torque request for the hybrid power train is contemplated herein.

The system 100 further includes a controller 118 having modules structured to functionally execute operations for managing operation of the engine 108. In certain embodiments, the controller 118 forms a portion of a processing subsystem including one or more computing devices having memory, processing, and communication hardware. The controller 118 may be a single device or a distributed device, and the functions of the controller 118 may be performed by hardware or software. In certain embodiments, the controller 118 includes one or more modules structured to functionally execute the operations of the controller 118. In certain embodiments, the controller 118 may alter the operation of the engine 108 in response to an SOC of the energy storage device 114.

Figure 2:
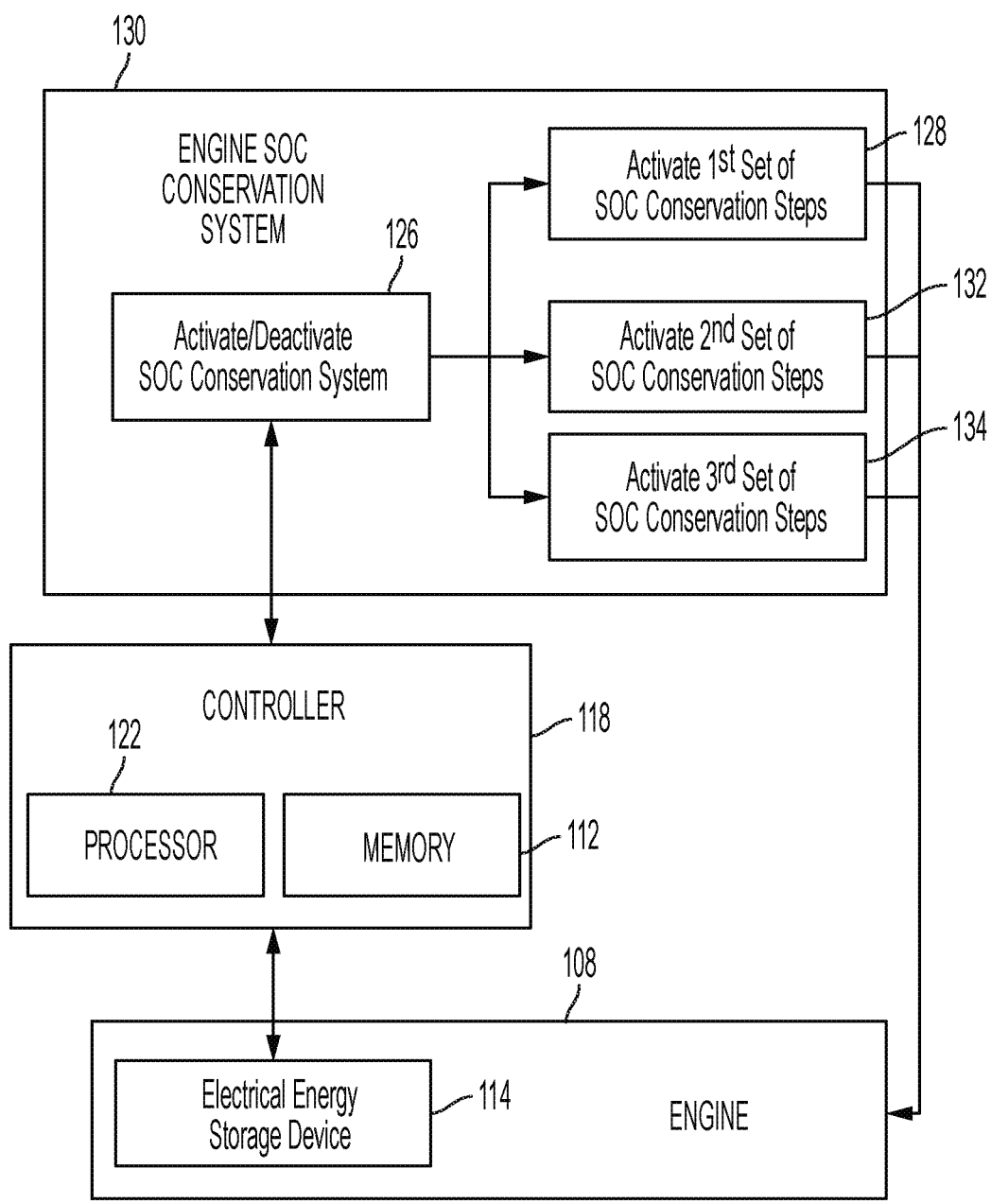
FIG. 2 is a block diagram of a control system for a state of charge (SOC) conservation system of the vehicle of FIG. 1.

Referring to FIG. 2, an exemplary control system for the engine 108 is shown. In particular, FIG. 2 shows the functional relationships between the controller 118 and other units of the system 100 (e.g., an engine SOC conservation system 130). The controller 118 includes a processor 122 and a non-transitory memory 112. The processor 122 executes the instructions stored in the memory 112, and the non-transitory memory 112 stores the aforementioned instructions regarding operation of the controller 118 and the threshold values for the engine SOC conservation system 130 as discussed further herein.

The controller 118 is in electrical communication with the electrical energy storage device 114 such that the controller 118 monitors the SOC of the electrical energy storage device 114 and periodically measures the SOC of the electrical energy storage device 114. Upon receiving the SOC of the electrical energy storage device 114, the processor 122 compares the SOC with threshold values stored in the memory 112. As discussed further herein, the threshold values include a plurality of values that each correspond with a set of SOC conservation steps (e.g., a first set of SOC conservation steps 128, a second set of SOC conservation steps 132, and a third set of SOC conservation steps 134).

Based on the comparison of the SOC of the electrical energy storage device 114 with the threshold values, the processor 122 of the controller 118 toggles the operational state of the engine SOC conservation system 130. If the SOC of the electrical energy storage device 114 is less than at least one of the threshold values stored in the memory 112, then the processor 112 activates the engine SOC conservation system 130 by toggling an activation switch 126 (e.g., a power switch) into an active state. The processor 122 of controller 118 then proceeds to activate one of the corresponding sets of the conservation steps 128, 132, 134 based on the measured SOC of the electrical energy storage device 114 in relation to the threshold values. These SOC conservation steps are then applied to the engine 108 and/or the system 100 (FIG. 1) as discussed further herein. Conversely, if the SOC of the electrical energy storage device 114 is greater than the threshold values stored in memory 112, then the processor 112 deactivates the engine SOC conservation system 130 by toggling an activation switch 126 (e.g., a power switch) into an inactive state.

During and after execution of the aforementioned procedure, the controller 118 monitors the SOC of the electrical energy storage device 114. After a predetermined time period, the controller 118 receives an updated SOC value of the SOC of the electrical energy storage device 114 and the aforementioned procedure is repeated.

The description herein including modules emphasizes the structural independence of the aspects of the controller 118 and illustrates one grouping of operations and responsibilities of the controller 118. Other groupings that execute similar overall operations are understood within the scope of the present-application. Modules may be implemented in hardware and/or software on computer readable medium, and modules may be distributed across various hardware or software components. Additionally, the controller 118 need not include all of the modules discussed herein.

Certain operations described herein include evaluating one or more parameters. Evaluating, as utilized herein, includes, but is not limited to, receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
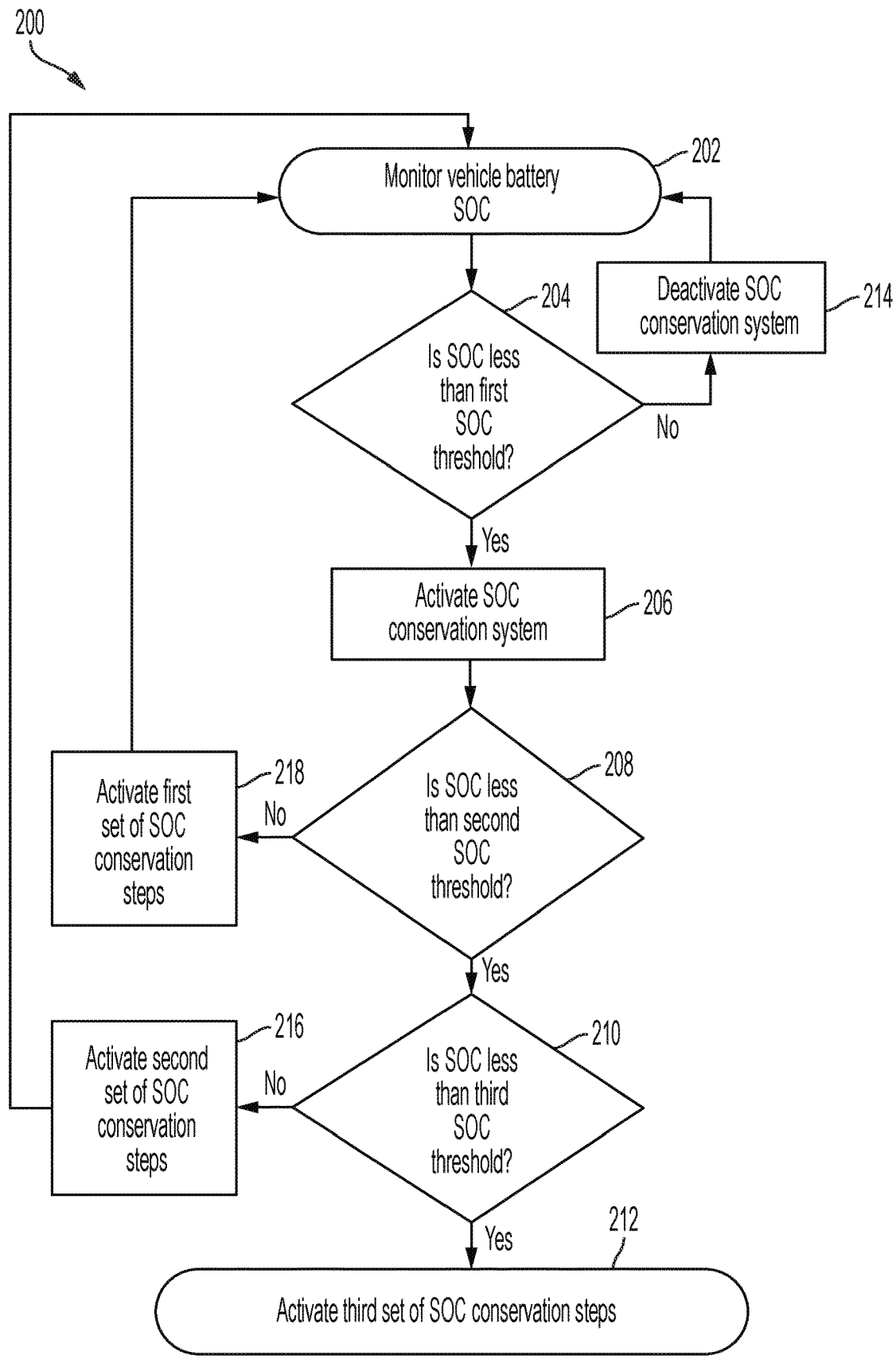
FIG. 3 is a flowchart illustrating a method for monitoring an SOC of a vehicle and extending vehicle range based on the SOC in accordance with the present disclosure.

Referring now to FIGS. 2 and 3, a method 200 is provided to monitor the SOC of the electrical energy storage device 114 and to alter operating conditions of the engine 108 depending on the SOC of the electrical energy storage device 114. The method 200 can be executed by the controller 118 (FIG. 1) or by an electronic control module (ECM, not shown). The method 200 begins at step 202 where the controller 118 monitors the SOC of the electrical energy storage device 114 during operation of the vehicle. Periodically, the controller 118 compares the SOC of the electrical energy storage device 114 to a predetermined first SOC threshold as indicated by block 204. In one embodiment, the first SOC threshold is an SOC value of between 10% to 20% of full capacity of the energy storage device 114. However, it is contemplated that in alternate embodiments, other SOC value ranges may be used. As shown, if the SOC of the energy storage device 114 is greater than the first SOC threshold, then the controller 118 deactivates the SOC conservation system 130 (if previously activated) at block 214 and then continues to monitor the SOC of the energy storage device 114 as indicated by block 202. The SOC conservation system 130 includes instructions for operating various remedial measures carried out by the controller 118 when the electrical energy storage device 114 SOC is less than the predetermined thresholds described further herein and as exemplified in functional blocks 204, 208, 210, 212, 216, and 218.

If at step 204, the SOC of the electrical energy storage device 114 is less than the first SOC threshold, the controller 118 activates the SOC conservation system 130 of the vehicle at block 206. After the SOC conservation system 130 is activated, the controller 118 compares the SOC of the electrical energy storage device 114 to a second SOC threshold at block 208. In one embodiment, the second SOC threshold includes a predetermined hysteresis value. It is contemplated that in alternate embodiments, other SOC thresholds (e.g., first SOC threshold, third SOC threshold, etc.) can include the hysteresis addition when comparing the SOC of the electrical energy storage device 114 to the SOC thresholds. As shown, if the SOC of the electrical energy storage device 114 is greater than the second SOC threshold, then the controller 118 activates a first set of SOC conservation steps 128 as discussed further herein. In one embodiment, the first set of SOC conservation steps 128 includes at least one of the following: flashing an indicator light (e.g., a low SOC lamp) at a slow rate (e.g., 1 flash per 3 seconds); ramping, over a calibratable time (e.g., 2 minutes), a road speed governor to a calibratable top speed value (e.g., 40 miles per hour (mph)); ramping, over a calibratable time (e.g., 2 minutes), a traction motor maximum power limit down to a calibratable (default 30%) derate (i.e., reduce maximum traction motor power by 30% such that the operator can still complete the mission yet the derate is intrusive enough such that the operator knows battery SOC is getting low); activating vehicle acceleration management to control/limit acceleration rate; disabling an air conditioning (A/C) compressor, if so equipped; increasing each cooling loop reference temperature (except battery cooling circuit) by a predetermined amount (e.g., 10° C.); modifying a shift schedule for best efficiency including inhibiting top gear operation, if needed; and reducing the rate of maximum allowable DC-DC converter power to a predetermined amount (e.g., 50%). After the first set of SOC conservation steps 128 are activated, the method 200 returns to block 202 where the controller 118 monitors the SOC of the electrical energy storage device 114. In one embodiment, the first SOC conservation steps 128 occur simultaneously. However, it is contemplated that in alternate embodiments, the first SOC conservation steps 128 occur in a predetermined, prioritized order based on the priority of the action.

Returning to block 208, if the SOC of the electrical energy storage device 114 is less than the second SOC threshold, then at step 210, the controller 118 compares the SOC of the electrical energy storage device 114 to a third SOC threshold. As shown, if the SOC of the electrical energy storage device 114 is greater than the third SOC threshold, then the controller 118 activates a second set of SOC conservation steps 132 at block 216. In one embodiment, the second set of SOC conservation steps 132 includes at least one of the following: flashing an indicator light (e.g., a low SOC lamp) at a faster rate (e.g., 1 flash per second); ramping, over a calibratable time (e.g., 2 minutes), a road speed governor to a calibratable value (e.g., 25 mph maximum speed); ramping, over a calibratable time (e.g., 2 minutes), an additional reduction in traction motor maximum power limit to a calibratable derate (e.g., 50%); if so equipped with on/off cooling loop control, disabling cooling loops (except battery cooling circuit); and automatically activating vehicle warning flashers. After the second set of SOC conservation steps 132 are activated, the method 200 returns to block 202 where the controller 118 monitors the SOC of the electrical energy storage device 114. In one embodiment, the second SOC conservation steps 132 occur simultaneously. However, it is contemplated that in alternate embodiments, the second SOC conservation steps 132 occur in a predetermined, prioritized order based on the priority of the action.

Returning to step 210, if the electrical energy storage device 114 SOC is less than the third SOC threshold 132, then a third set of SOC conservation steps 134 are activated at step 212. In one embodiment, the third set of SOC conservation steps 134 includes at least one of the following: providing/activating a solid indicator light (i.e., no flashing—solid "Low SOC" lamp); automatically playing a verbal message to the driver (e.g., a message to the driver or a song indicating that the SOC of electrical energy storage device 114 is low); and shutting down the high voltage system (through normal high voltage shutdown logic) of the vehicle. After the third set of SOC conservation steps 134 are activated, the controller 118 monitors the SOC of the electrical energy storage device 114 as the method 200 returns to block 202. In one embodiment, the third SOC conservation steps 134 occur simultaneously. However, it is contemplated that in alternate embodiments, the third SOC conservation steps 134 occur in a predetermined, prioritized order based on the priority of the action.

The method 200, as described herein, discloses three predetermined SOC thresholds. However, it is within the scope of the present disclosure that greater than or fewer than three SOC thresholds may be applied. In addition, in alternate embodiments, the method 200 can use distance thresholds in place of the SOC thresholds as discussed further herein.

Figure 4:
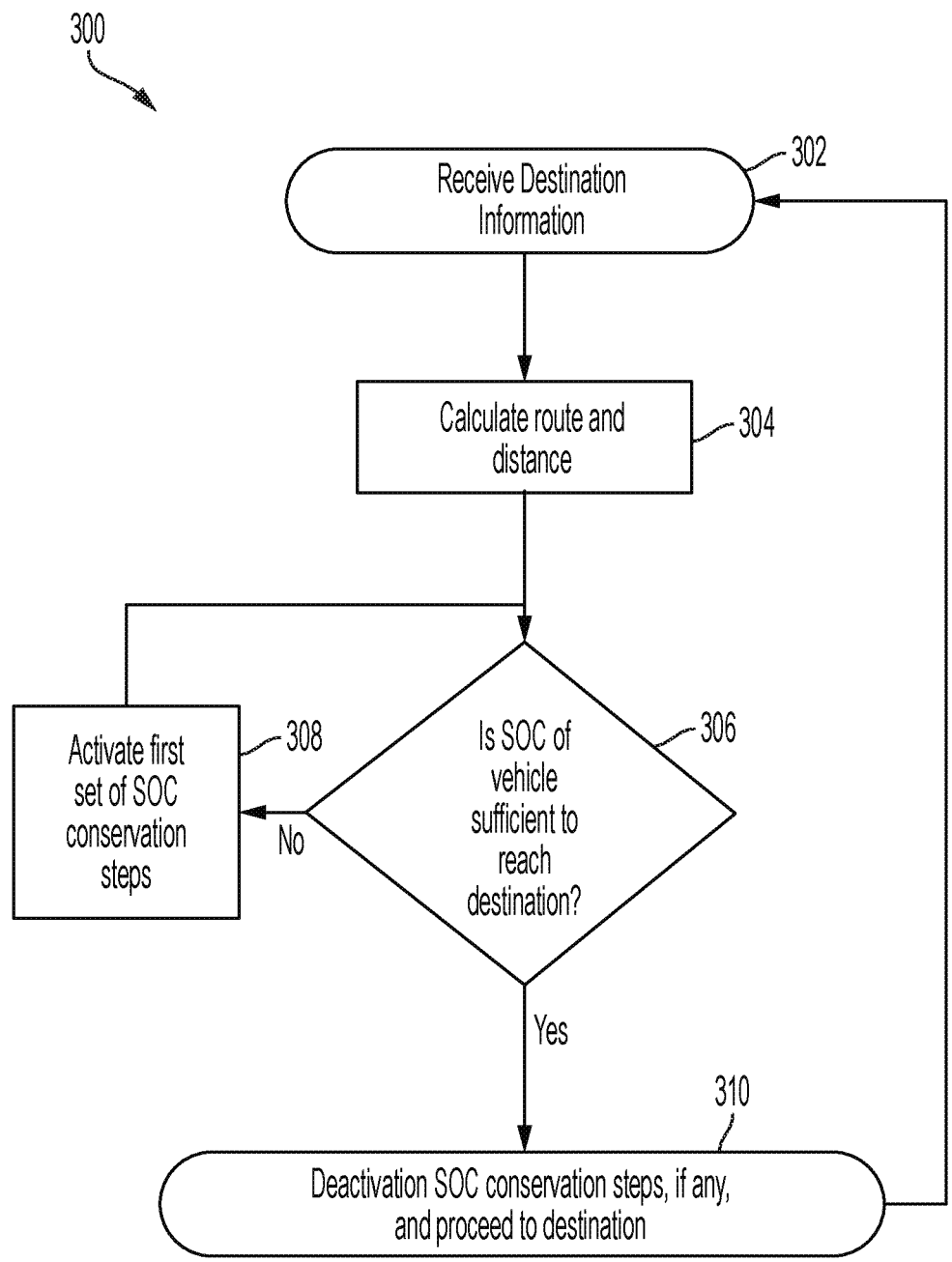
FIG. 4 is a flowchart illustrating a method for monitoring the SOC of a vehicle based on a distance to a destination in accordance with the present disclosure.

Referring now to FIG. 4, an alternate method 300 of monitoring the electrical energy storage device 114 SOC is provided. As discussed further herein, the method 300 receives the destination to which the vehicle is travelling and determines whether the vehicle under its current operating conditions and current SOC can reach the destination. If not, the method activates a series of SOC conservation steps to increase the range of the vehicle.

The method 300 can be executed by the controller 118 or by an electronic control module (ECM, not shown). As shown in FIG. 3, the method 300 begins at step 302 where the controller 118 receives destination information from the ECM. In another embodiment, the controller 118 receives destination information from an external GPS of a mobile device. Destination information can be relayed from an onboard GPS-based navigation system or, via a cellular network, or from a fleet manager's routing system. Alternatively, all destination calculations can be performed in a cloud-based application with the range comparison determination discussed herein being sent to the controller 118 instead of having the controller 118 perform the calculations. Once the destination information is received, the method 300 proceeds to block 204 where the route and distance are calculated. From this calculation, the controller 118 determines, at block 306, whether the SOC of the electrical energy storage device 114 is sufficient to reach the destination. If the SOC of the electrical energy storage device 114 is insufficient to reach the destination, then the controller 118 activates a set of SOC conservation steps at block 308. The set of SOC conservation steps include at least one of: flashing an indicator light (e.g., a low SOC lamp); ramping, over a calibratable time (e.g., 2 minutes), a road speed governor to a calibratable a top speed value (e.g., 40 miles per hour (mph)); ramping, over a calibratable time (e.g., 2 minutes), a reduction in traction motor power limit to a calibratable (default 30%) derate; activating a vehicle acceleration management to control/limit acceleration rate; disabling an air conditioning (A/C) compressor, if so equipped; increasing each cooling loop reference temperature (except battery cooling circuit) by a predetermined amount (e.g., 10° C.); modifying a shift schedule for best efficiency including inhibiting of top gear operation, if needed; reducing the rate of maximum allowable DC-DC converter power to a predetermined amount (e.g., 50%); if so equipped with on/off cooling loop control, disabling cooling loops (except battery cooling circuit); providing a solid indicator light (i.e., no flashing—solid "Low SOC" lamp); automatically playing a verbal message to the driver (e.g., a message to the driver or a song indicating that the electrical energy storage device 114 SOC is low); and shutting down the high voltage system (through normal high voltage shutdown logic) of the vehicle. After the set of SOC conservation steps are activated, the controller 118 monitors the SOC of the electrical energy storage device 114 at block 306 to determine whether the SOC is sufficient to reach the destination.

Returning to block 306, if the SOC of the electrical energy storage device 114 is sufficient to reach the destination, then the controller 118 deactivates any SOC conservation steps that are active, and the vehicle is permitted to proceed to the inputted destination at block 302. The method 300 then periodically returns to block 302 where the controller 118 monitors the vehicle SOC in relation to the destination until the vehicle reaches the destination.

In certain embodiments, the controller 118 can form a portion of a processing subsystem including one or more computing devices having memory, processing, and communication hardware. The controller 118 can be a single device or a distributed device, and functions of the controller 118 can be performed by hardware and/or as computer instructions on a non-transient computer readable storage medium, such as the non-transitory memory 112.

In certain embodiments, the controller 118 includes one or more interpreters, determiners, evaluators, regulators, and/or processors 122 that functionally execute the operations of the controller 118. The description herein including interpreters, determiners, evaluators, regulators, and/or processors emphasizes the structural independence of certain aspects of the controller 118 and illustrates one grouping of operations and responsibilities of the controller 118. Other groupings that execute similar overall operations are understood to be within the scope of the present disclosure. Interpreters, determiners, evaluators, regulators, and processors can be implemented in hardware and/or as computer instructions on a non-transient computer readable storage medium and can be distributed across various hardware or computer-based components.

Example and non-limiting implementation elements that functionally execute the operations of the controller 118 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A method for notifying a driver of a state of charge ("SOC") of an electrical energy storage device of a vehicle comprising:
    monitoring a current SOC of the electrical energy storage device with a processor during operation of the vehicle, including when a SOC conservation system is activated and deactivated, the SOC conservation system being configured to implement a plurality of SOC conservation steps that includes first and second sets of SOC conservation steps;
    retrieving a first predetermined SOC threshold and a second predetermined SOC threshold from a memory;
    comparing, with the processor, the current SOC with the first predetermined SOC threshold and the second predetermined SOC threshold, the first predetermined SOC threshold being greater than the second predetermined SOC threshold;
    operating the vehicle without the plurality of SOC conservation steps while the SOC is greater than the first SOC threshold and the second SOC threshold;
    responding to the current SOC being less than the first predetermined SOC threshold and greater than the second predetermined SOC threshold by activating the SOC conservation system with the processor, the SOC conservation system activating the first set of SOC conservation steps including derating a maximum traction motor power such that an operator of the vehicle is able to complete a mission knowing that battery SOC is getting low; and
    responding to the current SOC being less than the first predetermined SOC threshold and the second predetermined SOC threshold by causing the SOC conservation system to activate the second set of SOC conservation steps including further derating the maximum traction motor power so as to have the second set of SOC conservation steps be more intrusive than the first set of SOC conservation steps such that successive sets of SOC conservation steps in the plurality of SOC conservation steps increase in severity with decreasing SOC of the electrical energy storage device regardless of a distance of the electrical energy storage device from a destination.

2. The method of claim 1, further including:
    comparing the current SOC with a third predetermined SOC threshold, the second predetermined SOC threshold being greater than the third predetermined SOC threshold; and
    responding to the current SOC being less than the first predetermined SOC threshold, the second predetermined SOC threshold and the third predetermined SOC threshold by causing the SOC conservation system to activate a third set of SOC conservation steps.

3. The method of claim 2, wherein the third set of SOC conservation steps includes at least one of:
    activating a solid indicator light,
    providing a verbal indication to the driver of the vehicle
    shutting down a high voltage system of the vehicle, and
    activating an internal combustion engine of the vehicle.

4. The method of claim 1, wherein the SOC conservation system is deactivated when the current SOC is greater than the first predetermined SOC threshold.

5. The method of claim 1, wherein the vehicle is a battery electric vehicle or a range extended electric vehicle.

6. The method of claim 1, wherein the step of monitoring the current SOC of the electrical energy storage device with the processor includes measuring the current SOC of the electrical energy storage device periodically at predetermined time intervals.

7. The method of claim 1, wherein each conservation step of the first set of SOC conservation steps occurs simultaneously.

8. The method of claim 1, wherein each conservation step of the first set of SOC conservation steps occurs in a predetermined, prioritized order.

9. The method of claim 1, wherein the first set of SOC conservation steps includes derating the maximum traction motor power by about 30 percent, and wherein the second set of SOC conservation steps includes derating the maximum traction motor power by about 50 percent.

10. The method of claim 1, wherein the first set of SOC conservation steps further includes at least one of:
    flashing an indicator light at a first rate,
    limiting a speed of the vehicle to a first vehicle speed,
    reducing a SOC power limit,
    managing vehicle acceleration,
    disabling an air-conditioning compressor,
    decreasing a cooling rate,
    modifying a shift schedule, and
    reducing a rate of maximum allowable DC-DC converter power, and
wherein the second set of SOC conservation steps further includes at least one of:

flashing the indicator light at a second rate that is greater than the first rate,
limiting the speed of vehicle speed to a second speed that is less than the first vehicle speed,
reducing the SOC power limit,
disabling cooling loops thereby deactivating cooling, and activating vehicle warning flashers.

11. The method of claim 1, wherein the method constitutes an end of battery SOC vehicle system operation to facilitate the vehicle completing the mission.

12. A method for notifying a driver of a state of charge ("SOC") of an electrical energy storage device of a vehicle comprising:
monitoring a current SOC of the electrical energy storage device with a processor during operation of the vehicle, including when a SOC conservation system is activated and deactivated, the SOC conservation system being configured to implement a plurality of SOC conservation steps;
retrieving a first predetermined SOC threshold, a second predetermined SOC threshold, and a third predetermined SOC threshold from a memory;
comparing, with the processor, the current SOC with the first predetermined SOC threshold, the second predetermined SOC threshold, and the third predetermined SOC threshold, the first predetermined SOC threshold being greater than the second predetermined SOC threshold and the third predetermined SOC threshold, and the second predetermined SOC threshold being greater than the third predetermined SOC threshold;
operating the vehicle without the plurality of SOC conservation steps while the SOC is above the first and second SOC thresholds;
responding to the current SOC being less than the first predetermined SOC threshold and greater than the second predetermined SOC threshold by activating the SOC conservation system with the processor, the SOC conservation system activating a first set of SOC conservation steps that conserve a first amount of energy by derating a maximum traction motor power such that an operator of the vehicle is able to complete a mission knowing that battery SOC is getting low; and
responding to the current SOC being less than the first predetermined SOC threshold and the second predetermined SOC threshold by causing the SOC conservation system to activate a second set of SOC conservation steps that conserve a second amount of energy that is greater than the first amount of energy by further derating the maximum traction motor power so as to have the second set of SOC conservation steps be more intrusive than the first set of SOC conservation steps such that successive sets of SOC conservation steps in the plurality of SOC conservation steps increase in severity with decreasing SOC of the electrical energy storage device regardless of a distance of the electrical energy storage device from a destination.

13. The method of claim 12, wherein the first predetermined SOC threshold is a SOC value that is in the range of 10-20% of full capacity of the electrical energy storage device.

14. The method of claim 12, wherein the second predetermined SOC threshold includes a predetermined hysteresis value.

15. A control system for a vehicle, the controller having an end of battery SOC vehicle system operation for notifying a driver of a state of charge ("SOC") of an electrical energy storage device of a vehicle comprising:
monitoring a current SOC of the electrical energy storage device with a processor during operation of the vehicle, including when a SOC conservation system is activated and deactivated, the SOC conservation system being configured to implement a plurality of SOC conservation steps that includes first and second sets of SOC conservation steps;
retrieving a first predetermined SOC threshold and a second predetermined SOC threshold from a memory;
comparing, with the processor, the current SOC with the first predetermined SOC threshold and the second predetermined SOC threshold, the first predetermined SOC threshold being greater than the second predetermined SOC threshold;
operating the vehicle without the plurality of SOC conservation steps while the SOC is greater than the first SOC threshold and the second SOC threshold;
responding to the current SOC being less than the first predetermined SOC threshold and greater than the second predetermined SOC threshold by activating the SOC conservation system with the processor; and
responding to the current SOC being less than the first predetermined SOC threshold and the second predetermined SOC threshold by causing the SOC conservation system to activate the second set of SOC conservation steps in a manner,
wherein the second set of SOC conservation steps is more intrusive than the first set of SOC conservation steps to have successive sets of SOC conservation steps in the plurality of SOC conservation steps increase in severity with decreasing SOC of the electrical energy storage device regardless of a distance of the electrical energy storage device from a destination until an end of SOC of the electrical energy storage device to facilitate the vehicle completing a mission while the current SOC being less than the first predetermined SOC threshold and the second predetermined SOC threshold.

16. The control system of claim 15, wherein the first set of SOC conservation steps includes derating a maximum traction motor power such that an operator of the vehicle is able to complete a mission knowing that battery SOC is getting low and the second set of SOC conservation steps including further derating the maximum traction motor power.

17. The control system of claim 15, wherein the vehicle is a range extended electric vehicle or a battery electric vehicle, and wherein an operational mode of the vehicle does not change when the current SOC is less than the first predetermined SOC threshold and the second predetermined SOC threshold.

18. The control system of claim 15, wherein based on the comparison of the SOC of the electrical energy storage device with the first predetermined SOC threshold and the second predetermined SOC threshold, the control system toggles an operational state of the SOC conservation system between an active state and an inactive state.

19. The control system of claim 18, wherein the control system deactivates the SOC conservation system by toggling an activation switch into the inactive state when the current SOC is less than the first predetermined SOC threshold and the second predetermined SOC threshold.

20. The control system of claim 15, wherein the hysteresis addition is a predetermined value.

21. The control system of claim 15, wherein the control system implements a hysteresis addition when comparing the current SOC to the first predetermined SOC threshold and the second predetermined SOC threshold.

\* \* \* \* \*